United States Patent
Goto et al.

(10) Patent No.: US 6,368,245 B1
(45) Date of Patent: Apr. 9, 2002

(54) TOROIDAL-TYPE CONTINUOUSLY VARIABLE TRANSMISSION

(75) Inventors: Nobuo Goto; Hiroshi Kato; Masayoshi Shimizuya; Takashi Imanishi; Hisashi Machida; Hirotoshi Aramaki; Kinji Yukawa; Yuji Nakano, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/546,536

(22) Filed: Apr. 10, 2000

(30) Foreign Application Priority Data

Apr. 26, 1999 (JP) .......................... 11-117982
Jun. 22, 1999 (JP) .......................... 11-175392

(51) Int. Cl.⁷ .................. F16H 15/38; F16C 19/10; F16C 33/46
(52) U.S. Cl. .................. 476/46; 384/606; 384/614; 476/8
(58) Field of Search ................. 476/46, 8, 40; 384/470, 614, 606

(56) References Cited

U.S. PATENT DOCUMENTS

| | | | |
|---|---|---|---|
| 3,628,839 A | * 12/1971 | Vannest | 384/470 |
| 4,225,199 A | * 9/1980 | Earsley | 384/470 |
| 4,226,484 A | * 10/1980 | Glassow et al. | 384/470 |
| 4,425,011 A | * 1/1984 | Cunningham et al. | 384/571 |
| 5,015,105 A | * 5/1991 | Ueno | 384/531 |
| 5,328,277 A | * 7/1994 | Moulton | 384/470 X |
| 5,482,382 A | * 1/1996 | Sato et al. | 384/492 |
| 5,556,348 A | 9/1996 | Kokubu et al. | 476/40 |
| 5,575,733 A | 11/1996 | Machida et al. | 476/40 |
| 5,855,531 A | 1/1999 | Mitamura et al. | 476/46 |
| 6,083,137 A | * 7/2000 | Kato et al. | 476/8 |

FOREIGN PATENT DOCUMENTS

| | | | |
|---|---|---|---|
| JP | 63-167125 | * 7/1988 | |
| JP | 6-16753 | 3/1994 | F16H/15/38 |
| JP | 7-71555 | 3/1995 | F16H/15/38 |
| JP | 7-35847 | 7/1995 | F16H/15/38 |
| JP | 7-174146 | 7/1995 | F16C/33/66 |
| JP | 7-208568 | 8/1995 | F16H/15/38 |
| JP | 10-196754 | 7/1998 | F16H/15/38 |
| JP | 10-246301 | 9/1998 | F16H/15/38 |
| JP | 11-94042 | 4/1999 | F16H/15/38 |
| JP | 11-118011 | 4/1999 | F16H/15/38 |

* cited by examiner

*Primary Examiner*—Rodney H Bonck
(74) *Attorney, Agent, or Firm*—Sughrue Mion, PLLC

(57) ABSTRACT

In a toroidal-type continuously variable transmission, there is provided a thrust rolling bearing interposed between a power roller and a trunnion for supporting a thrust-direction load applied to the power roller. The thrust rolling bearing includes a plurality of rolling elements and a retainer rollably holding the plurality of rolling elements. The retainer defines a circular-ring-shaped main body and a plurality of pockets respectively formed in the main body for rollably holding the plurality of rolling elements. A clearance between the pocket and the rolling element is set in the range of 0.6 to 6.0% of the ball diameter of the rolling element.

5 Claims, 10 Drawing Sheets

FIG.13A
FIG.13B
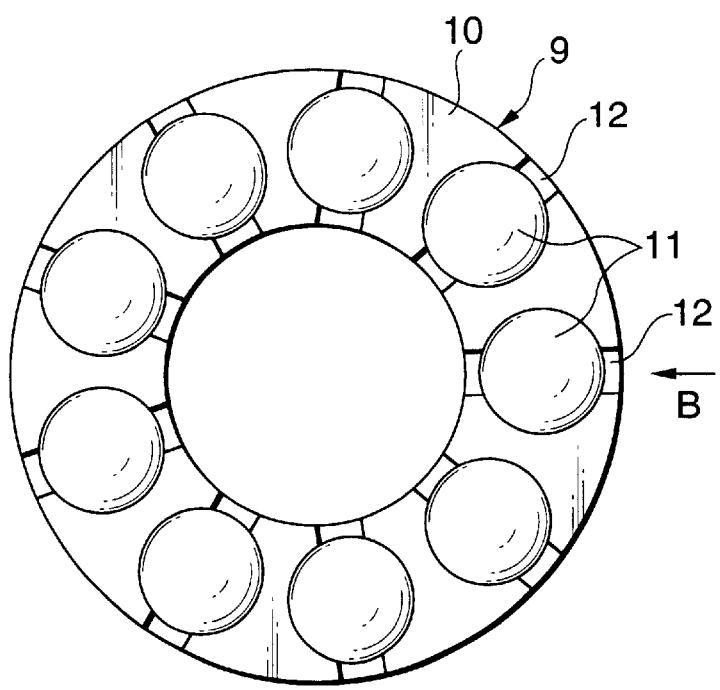
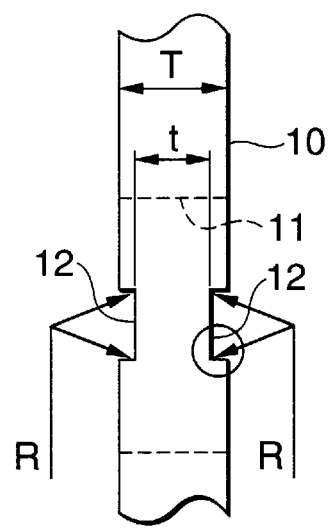

TOROIDAL-TYPE CONTINUOUSLY VARIABLE TRANSMISSION

BACKGROUND OF THE INVENTION

1. Field of the Invention

The present invention relates to a toroidal-type continuously variable transmission which is improved in a retainer for rollably holding a plurality of rolling elements.

2. Description of the Related Art

In recent years, as a transmission for a car, or as a transmission for various industrial machines, there has been used a toroidal-type continuously variable transmission. And, as the toroidal-type continuously variable transmission, for example, there are known a transmission disclosed in Japanese Utility Model Unexamined Publication No. 6-16753 of Heisei in which a retainer of a power roller bearing is integrally formed of synthetic resin, a transmission disclosed in Japanese Utility Model Unexamined Publication No. 7-35847 of Heisei in which there is formed an oil groove in a retainer to thereby enhance the lubrication efficiency thereof, and a transmission disclosed in Japanese Patent Unexamined Publication No. 7-174146 in which there is formed an oil hole in a retainer to thereby enhance the lubrication efficiency thereof.

The retainer of the above-mentioned power roller bearing is generally structured in such a manner as shown in FIG. 8.

That is, on the periphery of a rotary shaft 1, there are rotatably supported an input disk 2 and an output disk 3 having their respective inner peripheral surfaces opposed to each other. Between the input and output disks 2 and 3, there is interposed a trunnion 4 which is capable of swinging about its pivot shaft (not shown) situated at a torsional position with respect to the center axes of the input and output disks 2 and 3 (Here, "torsional position" means a physical relation which lies in a direction at right angles to the direction of the rotary shaft 1 but does not intersect the rotary shaft 1). The trunnion 4 includes a displacement shaft 5 and, on the periphery of the displacement shaft 5, there is disposed a power roller 6 which is rotatably supported in such a manner that it is held between the input and output disks 2 and 3. Further, between the power roller 6 and trunnion 4, there is interposed a thrust rolling bearing 7 which is used to receive a thrust-direction load applied to the power roller 6.

The respective inner peripheral surfaces 2a and 3a of the input and output disks 2 and 3 are formed as concave surfaces each having an arc-shaped section, while the peripheral surface 6a of the power roller 6 is formed as a spherically convex surface; and, the peripheral surface 6a is in contact with the inner peripheral surfaces 2a and 3a. The thrust rolling bearing 7 comprises a plurality of rolling elements 8 and a retainer 9 for rollably holding the plurality of rolling elements 8.

The retainer 9 is composed of a circular-ring-shaped main body 10 and a plurality of pockets 11 which are respectively disposed in the intermediate portions of the main body 10 in the diameter direction thereof to rollably hold the rolling elements 8. Further, the retainer 9 includes a plurality of lubricating oil passages 12 respectively formed as recessed grooves which are interposed between the inner and outer peripheries of the main body 10 in such a manner that they cross the pockets 11.

Therefore, according to the above-structured toroidal-type continuously variable transmission, even when the retainer 9 forming the thrust rolling bearing 7 shifts in the axial direction to thereby cause one surface of the retainer 9 to come into close contact with a surface opposed to the present surface of the retainer 9, a sufficient amount of lubricating oil is allowed to flow through the lubricating oil passage 12 into the pockets 11 holding the rolling elements 8. As a result of this, there is eliminated a fear that a part of the thrust rolling bearing 7 can wear excessively or can be seized to its adjoining member.

However, in the thrust rolling bearing 7 used as the power roller bearing of the toroidal-type continuously variable transmission, due to its structure designed for traction contact, as shown in FIG. 8, between the thrust rolling bearing 7 and input and output disks 2 and 3, there can be obtained only two contact points (loading points) respectively shown by arrow marks in FIG. 9, while the two contact points have a contact angle of α between them. Therefore, the inner race 7a of the thrust rolling bearing 7 not only receives a force in the thrust direction but also generates a component of force in the radial direction at the 180° opposite portion on the circumference thereof, so that the circular-ring-shaped thrust rolling bearing 7 is compressed in the radial direction.

Due to this compression, the inner race 7a is deformed into such an elliptical shape as shown in FIG. 9. Also, due to power transmission, in the traction contact portion, there is produced such a force 2Ft in the tangential direction as shown in FIG. 10A. This force turns into a force P which tends to fall down the thrust rolling bearing 7, as shown in FIG. 11B, thereby causing an imbalance in force.

In case where the thrust rolling bearing 7 is used in this condition, the rotational speeds of the rolling elements 8 around the retainer 9 show such distributions as shown in FIG. 11. That is, the rotational speeds of the rolling elements 8 (the lengths of arrow marks show the rotational speeds of the rolling element 8 around the retainer 9) in the 2Ft direction are lower than the rotational speeds of the rolling elements 8 in the anti-2Ft direction. Therefore, as shown in FIG. 12, the contact loads between the rolling elements 8 and retainer 9, in the anti-2FT direction, as shown by arrow marks (the lengths of the arrow marks represent the intensities of the contact loads), act so as to push the retainer 9 in its rotating direction but, in the 2Ft direction, acts so as to push the retainer 9 in the opposite direction to the rotating direction thereof. Accordingly, a compressive stress is applied to a pocket 11a, whereas a tensile stress is applied to a pocket 11b; and thus, during one rotation of the retainer 9, one pocket 11 receives one cycle of two-way stress loads ranging from the compressive stress to the tensile stress.

Also, conventionally, the lubricating oil passage 12 of the retainer 9 which is used under these conditions, as shown in FIGS. 13A and 13B, is formed of a recessed groove (a substantially U-shaped groove which includes two corner portions each formed as an arc R). Therefore, in case where a tensile stress is applied to the pocket 1, around the recessed groove, there is obtained such stress distribution as shown in FIG. 14; that is, there is a fear that the maximum stress X can be applied to the vicinity of the connecting portions between the two corner portions R and the bottom of the groove, thereby causing the retainer 9 to break around and from such connecting portions.

Also, the thrust rolling bearing 7 used as a power roller bearing in a toroidal-type continuously variable transmission handles the rolling elements 8 and retainer 8 as subassembling members in an intermediate step, in order to facilitate check and delivery to thereby reduce the manufacturing cost of the bearing in its assembling step. For this purpose, there is employed a so called "ball guide system" in which the retainer 9 is positioned by the rolling elements 8. In this system, no slide guide surface is provided for the inner and outer races to thereby be able to lower the dynamic torque loss of the bearing. This is especially important in the toroidal-type continuously variable transmission which is required to provide a high power transmission efficiency. In the ball guide system, a pocket clearance is important. In an ordinary bearing as well, the pocket clearance must be set not too large nor too small. Especially, in a power roller bearing for use in a toroidal-type continuously variable transmission, to the pockets of the retainer, there is applied a different force from that in an ordinary thrust ball bearing and, therefore, the pocket clearance of the power roller bearing must be set differently from the ordinary bearing.

In case where the clearance is set excessively small, a force applied to the retainer 9 tends to increase due to the difference between the rotational speeds of the rolling elements 8 around the retainer 9, thereby increasing the amplitude of the stress, with the result that the retainer 9 can be damaged due to the repeated stress fatigue. On the other hand, in case where the clearance is set excessively large, the retainer 9 can shake while rotating, thereby increasing the collision force between the retainer 9 and rolling elements 8, so that the retainer 9 can be damaged and the rolling elements 8 can peel off.

In the thrust rolling bearing 7 used as a power roller bearing, differently from the ordinary thrust bearing, the inner race 7a of the thrust rolling bearing 7 transmits power and, therefore, there is exerted a traction force which is a radial force. This radial force is supported by a needle roller bearing interposed between the inner race 7a and displacement shaft 5. However, the needle roller bearing requires a proper clearance and, thus, the inner and outer races tend to shift from each other by an amount equivalent to this clearance. Due to this, the rolling elements 8 vary only slightly in the contact angle depending on the positions of the rolling elements 8.

The rotational speed of each rolling element 8 of the power roller bearing around the retainer can be expressed by the following equation: that is, $$\omega c = (1 - D_a/d_m \cos\alpha) \, n_i/2$$

where Da expresses a ball diameter, dm expresses the pitch diameter of the rolling element, and ni expresses an inner race rotational speed, respectively. The rotational speed of the rolling element 8 around the retainer varies according to the contact angles α, that is, in the power roller bearing, the rotational speed varies according to the positions of the rolling element 8. Due to such difference between the rotational speeds of the rolling element 8, the rolling element 8 can be butted against and moved away from the retainer 9, thereby applying a force to the retainer 9.

As described above, the position of the rolling element 8 is caused to shift in the circumferential direction thereof according to the positions (orientation angles) of the rolling element 8 in the circumferential direction thereof. Here, a graphical representation in FIG. 7 shows the amounts of such shift in the position of the rolling element 8. In case where the shift amount is larger than the clearance between the pocket 11 and rolling element 8, the rolling element 8 presses against the retainer 9, so that such pressing force is repeatedly applied to the retainer 9 to thereby cause the retainer 9 to be damaged.

The parts structure of the above power roller bearing, except for the power roller 6 provided in the inner race 7a, is almost similar in appearance to the thrust ball bearing used to support the rotary shaft 1 onto which the thrust load is applied. Accordingly, it has been studied whether the power roller bearing of a toroidal-type continuously variable transmission can be produced at a low cost by diverting parts designed for use in an existing thrust ball bearing.

However, it is true that the parts structure of the power roller bearing is quite similar in appearance to the thrust ball bearing, but the power roller bearing is quite different in the function of the inner race 7a from the ordinary thrust ball bearing. Due to this, in the power roller bearing, the distribution of loads applied to the inner race 7a itself as well as the contact behaviors between the rolling elements 8, which are interposed between the inner and outer races, and the inner and outer races are greatly different from those of the ordinary thrust ball bearing. Therefore, it is indispensably necessary to make various improvements in the power roller bearing with such differences from the ordinary thrust ball bearing into account.

For example, in the ordinary thrust ball bearing, the inner race is used as a support member for supporting the shaft of the thrust ball bearing. On the other hand, in the power roller bearing, the power roller 6 rotating integrally with the inner race 7a is a power transmission member which is used to transmit the rotation of the input disk 2 to the output disk 3 and corresponds to a speed change gear of a gear-type multistage transmission. And, since the power roller 6 is rotated at a high speed in such a state that it receives a strong pressure from the input and output disks 2 and 3, it generates great heat and such great heat generated in the power roller 6 heats the inner race 7a and rolling elements 8. For this reason, as lubricating oil to be supplied into between the inner and outer races, it is necessary to use high-viscosity traction oil which has been developed specially for the purpose of power transmission.

Also, the traction portions, where the power roller 6 comes into contact with the input and output disks 2 and 3, provide mutually opposing positions which are spaced 180° apart from each other on the outer peripheral edge of the power roller 6, so that the strong pressures from the input and output disks 2 and 3 are concentratedly applied onto these mutually opposing positions (traction portions) as radial loads. Therefore, in the traction portions where the power roller 6 is contacted with the input and output disks 2 and 3, there is generated a very high contact surface pressure.

For example, the ordinary bearing is used under the contact surface pressure of 2 to 3 GPa or less; and, on the other hand, in the power roller bearing used in a toroidal-type continuously variable transmission, in normal deceleration, the contact surface pressure thereof increases up to a pressure in the range of 2.5 to 3.5 Gpa and, in the maximum deceleration, there is a possibility that the contact surface pressure can reach a pressure as large as 4 GPa.

Further, the strong pressures given from the input and output disks 2 and 3 are concentratedly applied as the radial loads at the 180° spaced mutually opposing positions on the traction portions of the power roller 6, so that the power roller 6 and the inner race 7a with the power roller 6 mounted thereon are compressed and deformed in the radial direction thereof. Since such compressive deformation warps the inner race 7a, it is almost impossible that the thrust loads applied onto the inner race 7a from the power roller 6 can be shared uniformly among the plurality of rolling elements 8 respectively interposed between the inner race 7a and outer race. That is, the thrust load acts concentratedly on some of the rolling elements 8 which are situated in the mutually opposing positions, with the result that the contact surface pressure of the rolling elements 8 with the raceway grooves is caused to vary and thus such some of the rolling elements 8 are caused to roll on the raceway grooves with a very high contact pressure.

Therefore, it is indispensable that the traction portions to come into contact with the input and output disks 2 and 3 as well as the raceway grooves of the inner and outer races to be contacted by the rolling elements 8 must be specially adjusted in the material, surface hardness, and surface roughness thereof in order to prevent the reduced life of the power roller bearing caused by the localized action of the high-contact surface pressure.

From the above background, the present applicants have already proposed a technology in which, in order to enhance the durability of the power roller bearing against the localized action of the high contact surface pressure to thereby be able to enhance the life of the power roller bearing, the rolling elements 8 are respectively made of middle carbon steel or high carbon steel as well as the surface hardness and strength of the rolling elements 8 are adjusted using carbonitrising treatment and hardening and tempering treatment (see Japanese Patent Unexamined Publication No. 7-208568 of Heisei).

Also, the present applicants have proposed a technology in which the input and output disks 2 and 3 as well as the power roller 6 and inner race 7a to be contacted with the input and output disks 2 and 3 are carburized and, after then, are ground or finished, or they are carbonitrided and, after then, are ground or finished to thereby adjust the hardness and effective hardened layer depth of the surfaces of these members to a proper value (in the range of 2 to 4 mm) capable of standing against the action of the localized contact surface pressure (see Japanese Patent Unexamined Publication No. 7-71555 of Heisei).

However, although the traction oil is employed as the lubricating oil to be supplied into between the inner and outer races, and the power roller 6, inner race 7a and rolling elements 8 are made of selected materials and surface treated to thereby adjust the surface hardness, effective hardened layer depth and surface roughness to their respective proper conditions, the desired lives of the above-mentioned traction portions and inner and outer races raceways of the power roller bearing cannot be obtained in a sufficient level.

Since the original object of the power roller bearing is to transmit power, it is important that the dynamic torque loss within the bearing can be reduced as much as possible to thereby enhance the torque transmission efficiency. However, only by the above-mentioned improvements, there is still left a possibility that, depending on the setting of the dimensions of the raceway grooves on the inner and outer races as well as the rolling elements 8, the dynamic torque loss within the bearing can increase to thereby lower the torque transmission efficiency.

Also, in spite of the above-mentioned proper adjustment of the hardness and effective hardened layer depth of the surfaces of the power roller 6 and inner race 7a, there is still left a possibility that, the edges of the raceway grooves and rolling elements 8 can be damaged early or the contact surfaces of the raceway grooves and rolling elements 8 can be damaged to thereby lower the life of the bearing.

SUMMARY OF THE INVENTION

The present invention aims at eliminating the drawbacks found in the above-recited conventional toroidal-type continuously variable transmissions. Accordingly, it is an object of the invention to provide a toroidal-type continuously variable transmission which can relieve the distribution of stresses applied to a plurality of lubricating oil passages formed in a retainer used therein, and further can secure the required strength of a retainer, can guide rolling elements properly, and thus can enhance the durability of the transmission.

According to one aspect of the invention, there is provided a toroidal-type continuously variable transmission, including: a rotary shaft; first and second disks rotatably supported on the periphery of the rotary shaft respectively, each of the inner surfaces of the first and second disks defining a concave surface having an arc-shape in section, the inner surfaces of the first and second disks being disposed opposed to each other; a trunnion swinging about a pivot shaft situated at a torsional position with respect to the center axes of the first and second disks; a displacement shaft provided in the trunnion; a power roller held between the first and second disks in such a manner as to be rotatably supported on the periphery of the displacement shaft, the power roller including a peripheral surface formed in a spherical convex surface; and a thrust rolling bearing interposed between the power roller and the trunnion for supporting a thrust-direction load applied to the power roller. The thrust rolling bearing includes a plurality of rolling elements and a retainer rollably holding the plurality of rolling elements. The retainer defines a circular-ring-shaped main body and a plurality of pockets respectively formed in the main body for rollably holding the plurality of rolling elements. A clearance between the pocket and the rolling element is set in the range of 0.6 to 6.0% of the ball diameter of the rolling element.

To secure the strength of the retainer, the retainer is designed in such a manner that its outside diameter is as large as possible unless the retainer interferes with the traction surface. Shaking of the retainer gives rise to the mutual contact between the outside diameter of the retainer and traction surface, thereby causing the traction surface, which is transmitting high power, to be damaged. According to a test using rolling elements each of about 16 mm, in case of a clearance of 0.1 mm or less, the retainer was damaged and, in case of a clearance of 0.9 mm or more, the rolling elements were heavily damaged. Therefore, the clearance between the pocket and rolling element may be preferably set in the range of 0.6 to 6.0% of the ball diameter of the rolling element.

Further, according to another aspect of the invention, there is provided a toroidal-type continuously variable transmission, including: a rotary shaft; first and second disks rotatably supported on the periphery of the rotary shaft respectively, each of the inner surfaces of the first and second disks defining a concave surface having an arc-shape in section, the inner surfaces of the first and second disks being disposed opposed to each other; a trunnion swinging about a pivot shaft situated at a torsional position with respect to the center axes of the first and second disks; a displacement shaft provided in the trunnion; a power roller held between the first and second disks in such a manner as to be rotatably supported on the periphery of the displacement shaft, the power roller including a peripheral surface formed in a spherical convex surface; and a thrust rolling bearing interposed between the power roller and the trunnion for supporting a thrust-direction load applied to the power roller. The thrust rolling bearing includes a plurality of rolling elements and a retainer rollably holding the plurality of rolling elements. The retainer defines a circular-ring-shaped main body, a plurality of pockets respectively formed in the main body for rollably holding the plurality of rolling elements and a plurality of lubricating oil passages respectively formed between the inner and outer peripheral edges of the main body in such a manner as to cross the pockets respectively. Each of said lubricating oil passages having a section formed in a single arc shape.

According to the above structure, the forcibly supplied lubricating oil passes through the lubricating oil passages formed in the retainer to thereby be able to lubricate the thrust rolling bearing. Also, since the section of each of the lubricating oil passages has a single arc shape, there can be relieved stresses which are generated in the lubricating oil passages.

BRIEF DESCRIPTION OF THE DRAWINGS

FIG. 1A is a plan view of the retainer, and FIG. 1B is a longitudinal side section view of the retainer;

FIG. 2A shows the movement of a rolling element in the pocket, and FIG. 2B is a longitudinal side section view of the pocket;

FIG. 3A is a plan view of the retainer, FIG. 3B is a longitudinal side section view of the retainer, and FIG. 3C is an enlarged plan view of a pocket formed in the retainer;

FIG. 5A is a plan view of the retainer, FIG. 5B is a side view of the retainer, when viewed from the direction of an arrow mark A shown in FIG. 5A;

FIG. 13A is a plan view of the retainer in the thrust rolling bearing in the conventional a toroidal-type continuously variable transmission, and FIG. 13B is a side view of the retainer, when viewed from the direction of an arrow mark B shown in FIG. 13A; and, FIG. 14 shows the distribution of stresses occurring in a lubricating oil passage in the thrust rolling bearing in the conventional toroidal-type continuously variable transmission.

DETAILED DESCRIPTION OF THE PREFERRED EMBODIMENTS

Figure 1A:
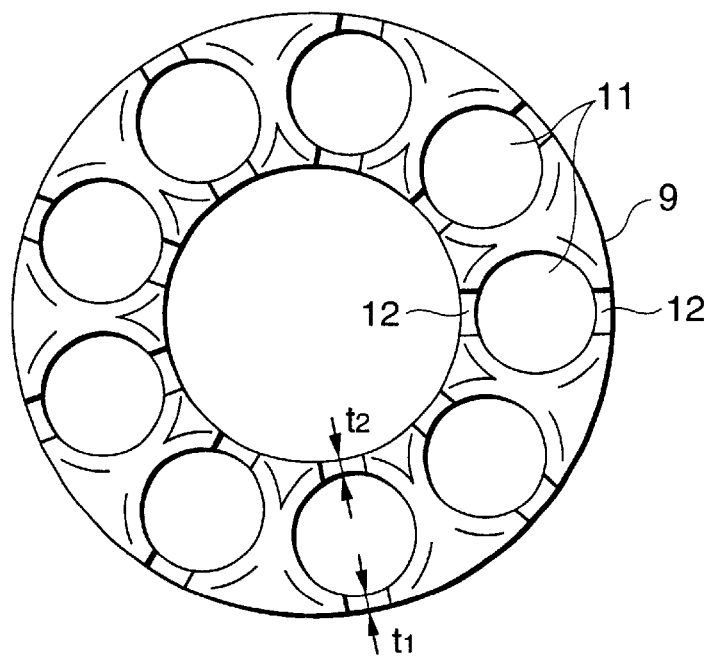
FIGS. 1A and 1B show a first embodiment of a retainer for use in a toroidal-type continuously variable transmission according to the invention; in particular.
Figure 1B:
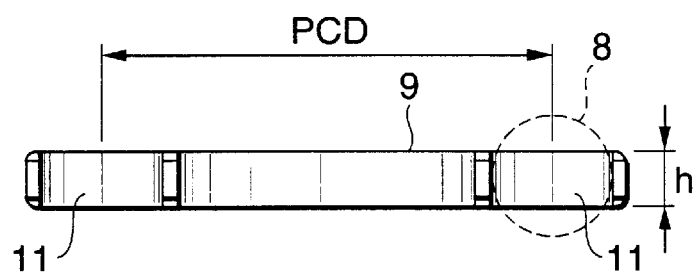

Now, a description will be given below of the preferred embodiments of a toroidal-type continuously variable transmission according to the invention with reference to the accompanying drawings.

FIGS. 1A to 2B respectively show a first embodiment of a toroidal-type continuously variable transmission according to the invention.

As described above, in the thrust rolling bearing 7 which is used as a power roller bearing in a toroidal-type continuously variable transmission, in order to facilitate check and delivery in the assembling process of the thrust rolling bearing 7 to thereby reduce the manufacturing cost thereof, the rolling elements 8 and retainer 9 are handled as sub-assembling members in the intermediate step of the assembling process. For this reason, there is employed a so called ball guide system in which the retainer 9 is positioned by the rolling elements 8. In this system, no slide guide surface is provided for the inner and outer races to thereby reduce the dynamic torque loss of the bearing. This is especially important in a toroidal-type continuously variable transmission which is required to provide a high power transmission efficiency.

In the ball guide system, a pocket clearance between the pockets 11 of the retainer 9 and rolling elements 8 is important. The pocket clearance must not be too large or too small. Especially, in the power roller bearing of the toroidal-type continuously variable transmission, there is applied a force which is different from that in an ordinary thrust ball bearing and, therefore, the pocket clearance of the thrust rolling bearing 7 is set differently from the ordinary thrust ball bearing.

In case where the clearance is set excessively small, a force applied to the retainer 9 tends to increase due to the difference between the rotational speeds of the rolling elements 8 around the retainer 9, thereby increasing the amplitude of the stress, with the result that the retainer 9 can be damaged due to the repeated stress fatigue. On the other hand, in case where the clearance is set excessively large, the retainer 9 can be shaken while rotating, thereby increasing the collision force between the retainer 9 and rolling elements 8, so that the retainer 9 can be damaged and the rolling elements 8 can peel off.

To secure the strength of the retainer 9, the retainer 9 is designed in such a manner that its outside diameter is as large as possible unless the retainer 9 interferes with the traction surface. The shaking of the retainer 9 generates the mutual contact between the outside diameter of the retainer 9 and traction surface, whereby the traction surface transmitting high power can be damaged. According to a test using rolling elements each of about 16 mm, in case of a clearance of 0.1 mm or less, the retainer was damaged in a short time and, in case of a clearance of 0.9 mm or more, a remarkable damage is found in the rolling elements 8. Therefore, the clearance between the pocket 11 and rolling element 8 may be preferably set in the range of 0.6 to 6.0% of the ball diameter of the rolling element 8.

Also, to the retainer 9, there is applied a force peculiar to a toroidal-type continuously variable transmission. On the dimensions of the inside and outside diameters of the retainer 9, there is a restraint caused by the interference of the retainer 9 with other parts and, therefore, an increase in the thickness of the retainer 9 in the radial direction thereof means that the rolling elements 8 decrease in size. In case where the rolling elements 8 are small in size, the load capacity of the bearing is lowered, which makes it impossible to obtain sufficient durability as a bearing for a car. Therefore, in case where the thickness of the retainer 9 in the radial direction thereof (which is shown by $t_1$, $t_2$ in FIG. 1) is set about 10% or more of the ball diameter of the rolling element 8, not only the durability of the bearing raceway can be kept but also the damage of the retainer 9 can be prevented. By the way, in case where material having a high strength such as HBSC1 is used as the material of the retainer 9, the retainer 9 can be used even when it has a thickness of the order of 7% in the radial direction thereof.

Also, as a matter of course, the PCD of the retainer 9 is identical with the PCD of the raceway. However, since the present retainer 9 employs the ball guide system, accuracy is required of the retainer 9 and, therefore, the PCD of the retainer 9 is set for an error of 0.1 mm or less with respect to the PCD of the raceway. Further, unless the surface of the retainer 9 is a certain degree of flat and smooth surface, the surface roughness of the retainer 9 causes the damage of the retainer 9 when it comes into contact with the rolling elements 8 as well as with inner and outer races and, therefore, the surface roughness of the portions of the retainer 9, where the retainer 9 is contacted with the rolling elements 8 as well as inner and outer races, is set as a roughness value of 6.3 Ra or less.

Figure 2A:
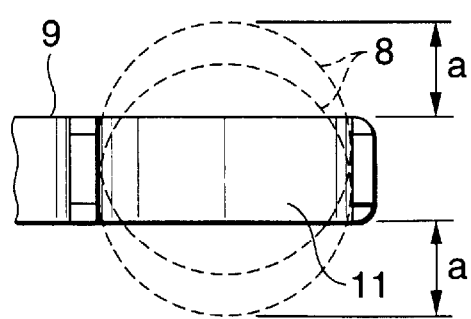
FIGS. 2A and 2B show a pocket employed in the first embodiment; in particular.
Figure 2B:
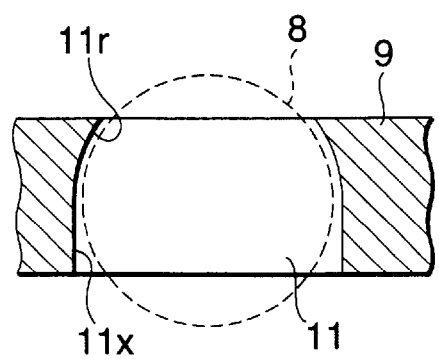

Further, as shown in FIGS. 2A and 2B, the pocket 11 of the retainer 9 is structured so as to prevent the rolling element 8 from rolling out of the pocket 11. Specifically, the hole shape of the pocket 11 is constructed by a combination of a cylindrical portion 11x and a spherical surface 11r. Therefore, the rolling element 8 is fitted with the spherical surface 11r side of the pocket 11 to thereby prevent the rolling element 8 from rolling out of the pocket 11, and the opposite side of the pocket 11 is worked by caulking or the like to thereby prevent the rolling element 8 from slipping off. By the way, in this case, it is important that such caulking does not restrict the movement of the rolling element 8 but allows the rolling element 8 to move slightly in the axial direction of the retainer 9. The projection amount a of the rolling element 8 from the end face of the retainer 9 is set larger than the depth of the raceway grooves respectively formed in the inner and outer races. Here, in FIG. 2A, a dot line of an upper side shows a state in which the rolling element 8 moves upwardly, whereas a dot line of a lower side shows a state in which the rolling element 8 moves downwardly.

Also, the ball diameter of the rolling element 8 is of the order of 20 to 40% of PCD, the thickness h of the retainer 9 in the axial direction thereof is of the order of 30 to 60% of the ball diameter of the rolling element 8, and there are necessary clearances respectively between the retainer 9 and inner race as well as between the retainer 9 and outer race, while each clearance is set for 1 mm.

Further, as the material of the retainer 9, there is used material such as JIS H5102 high tension brass. The material may also be an iron plate which has a tensile strength of 400 N/mm$^2$ or higher and is softer than the rolling element 8 as well as inner and outer races when it collides with them.

Figure 3C:
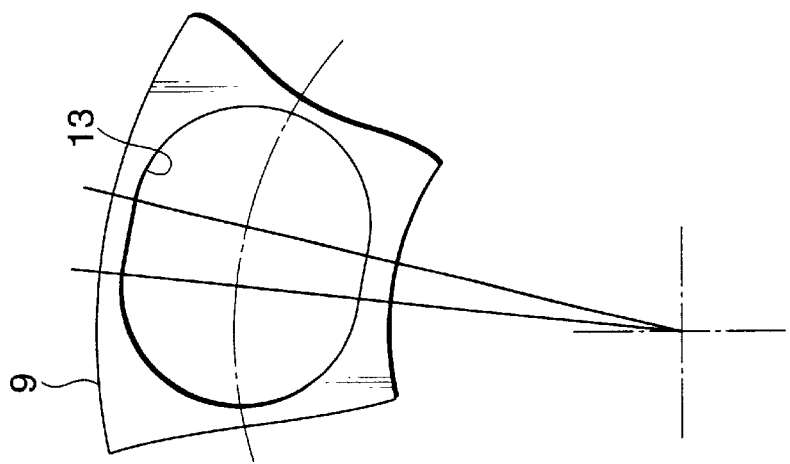
FIGS. 3A to 3C show a second embodiment of a retainer for use in a toroidal-type continuously variable transmission according to the invention; in particular.
Figure 3A:
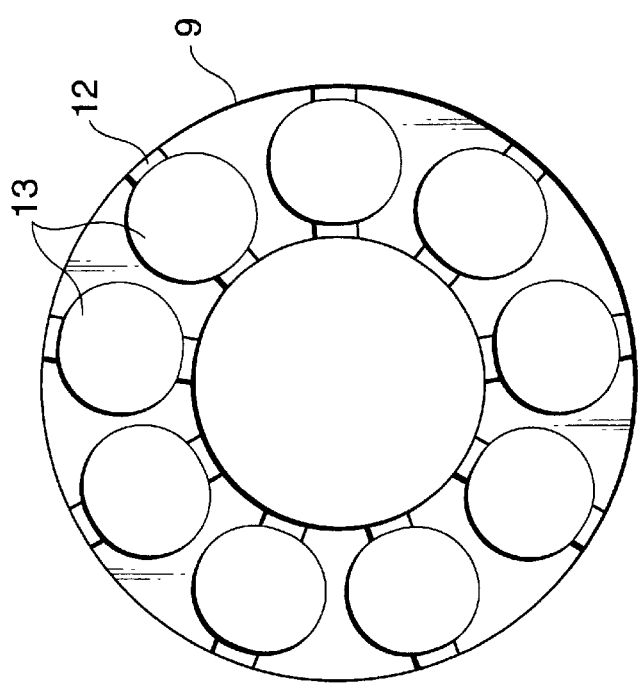
Figure 3B:
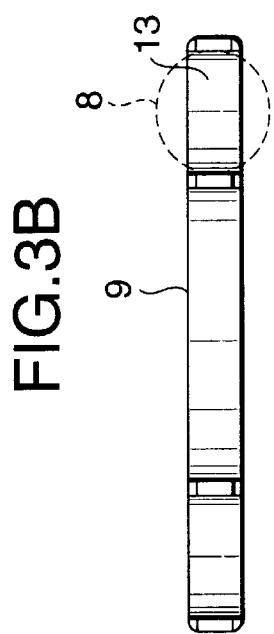

Now, FIGS. 3A to 3C show a second embodiment of a toroidal-type continuously variable transmission according to the invention. A pocket 13 provided in a retainer 9 is formed in an elongated hole. The length of the pocket 13 in the circumferential direction of the retainer 9 is longer than the length of the pocket 13 in radial direction of the retainer 9, while their ratio is 1.03 or more. Since the pocket 13 is formed as an elongated hole which is longer in the circumferential direction of the retainer 9, the force of the rolling element 8 with which the rolling element 8 presses against the end face of the pocket 13 is lowered and a force applied onto the retainer 9 is also lowered, thereby being able to prevent the retainer 9 against damage. The rolling element 8 includes not only a portion which rotates fast with respect to the retainer 9 but also a portion which, at the 180° opposite position thereof, rotates more slowly than the retainer 9; that is, the rolling element 8 rotates while it is advancing and retreating in the longitudinal direction of the pocket 13 being an elongated hole.

Figure 4:
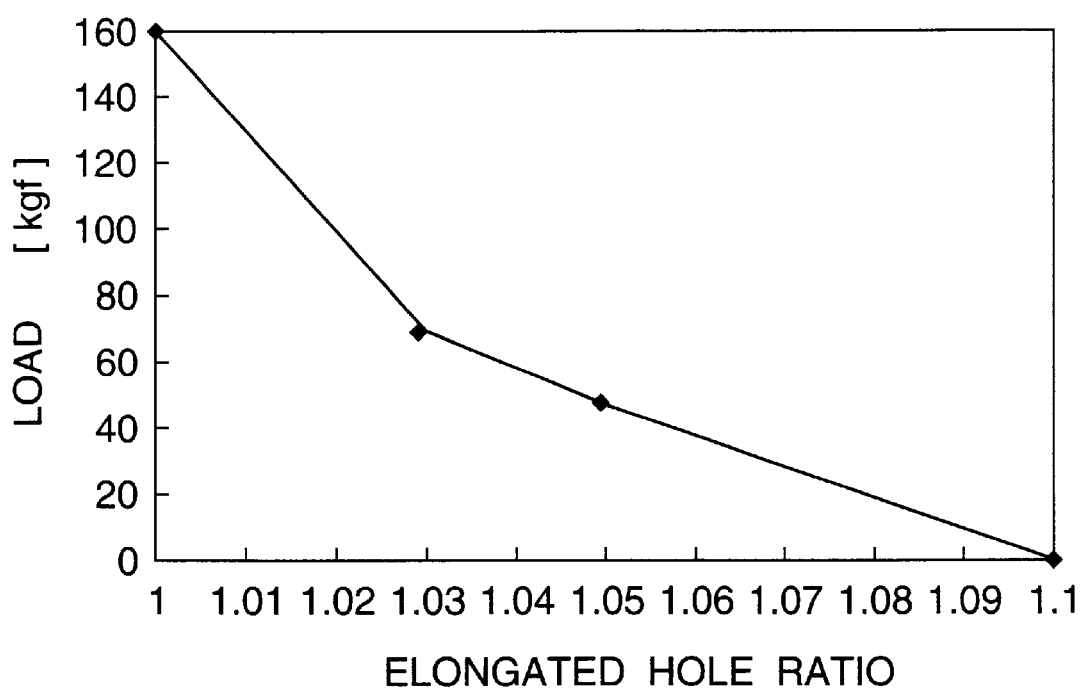
FIG. 4 is a graphical representation of elongated hole ratios of the pocket in the second embodiment, and forces which correspond to the elongated hole ratios and with which rolling elements press against the retainer.

Now, FIG. 4 shows the ratios of the elongated hole of the pocket 13 and forces (loads) of the rolling element 8 against the retainer 9, which correspond to these ratios. As the elongated hole ratio increases, the load is reduced. Especially, in case where the ratio of the length in the circumferential direction to the length in the radial direction is 1.03 or more, the lowering amount (inclination) of the load is small compared with an increase in the elongated hole ratio. Accordingly, it can be understood that, in case where the ratio is 1.03 or more, a load reducing effect can be obtained sufficiently. In case where the elongated hole ratio is set excessively large, the distance between the pockets 13 of the retainer 9 is narrowed, which lowers the strength of the retainer 9 to thereby cause the retainer to be damaged. According to our test, unless the distance between the pockets 13 is at least equal to or larger than 0.1 times the minor diameter (the length of the retainer in the radial direction) of the pocket 13, the retainer can be damaged.

Figure 5A:
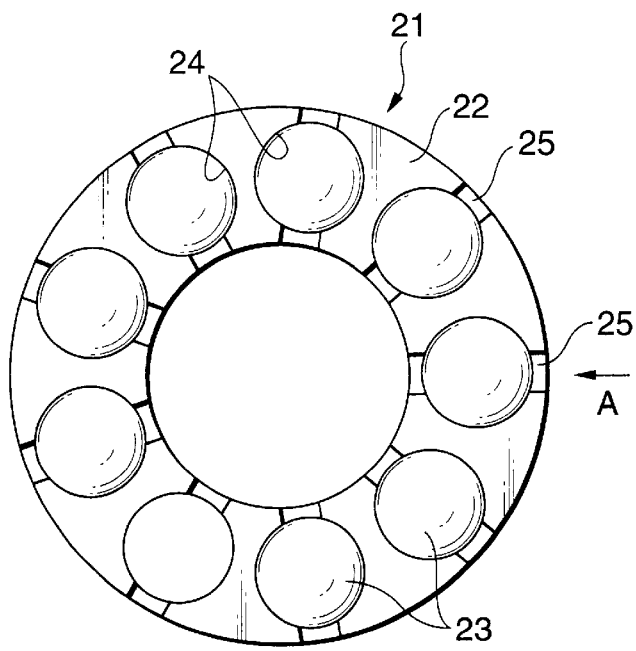
FIGS. 5A and 5B show a third embodiment of a retainer for use in a toroidal-type continuously variable transmission according to the invention; in particular.
Figure 5B:
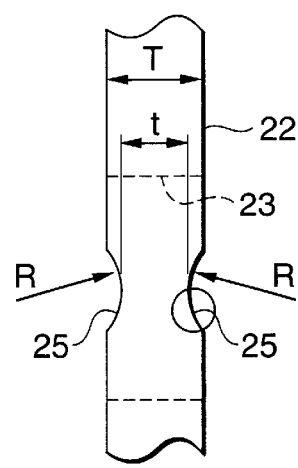
Figure 6:
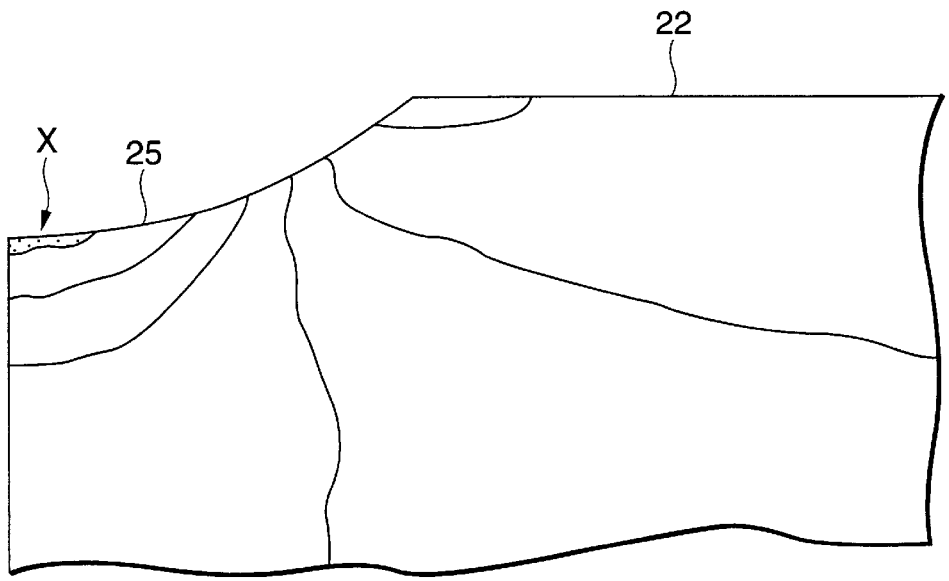
FIG. 6 shows the distribution of stresses occurring in a lubricating oil passage employed in the third embodiment.
Figure 7:
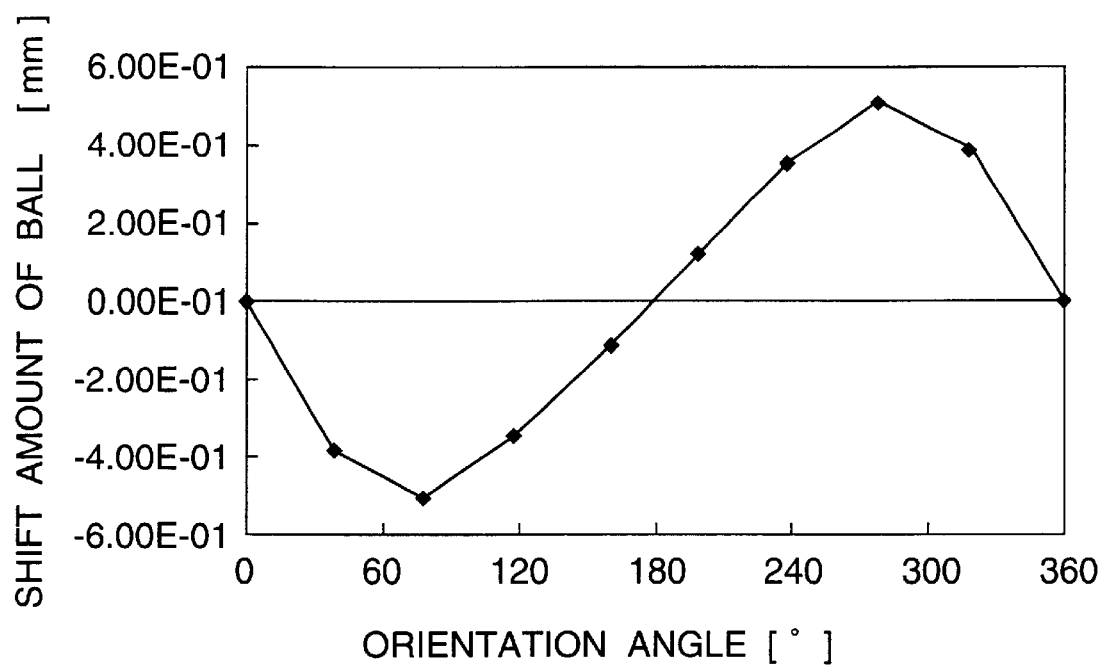
FIG. 7 is a graphical representation of the amounts of shift of a rolling element when the rolling element shifts in position in the circumferential direction of a retainer according to the positions (orientation angles) of the rolling element within the retainer in the circumferential direction of the retainer.
Figure 8:
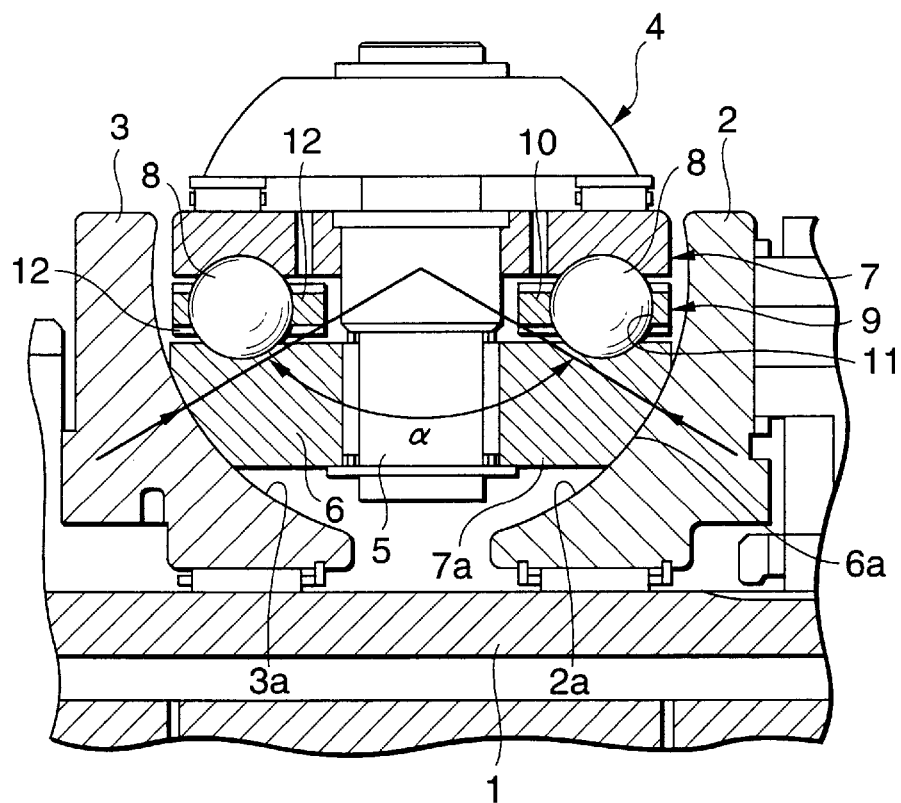
FIG. 8 is a longitudinal side section view of a thrust rolling bearing and a lubricating device for use in a conventional toroidal-type continuously variable transmission.
Figure 9:
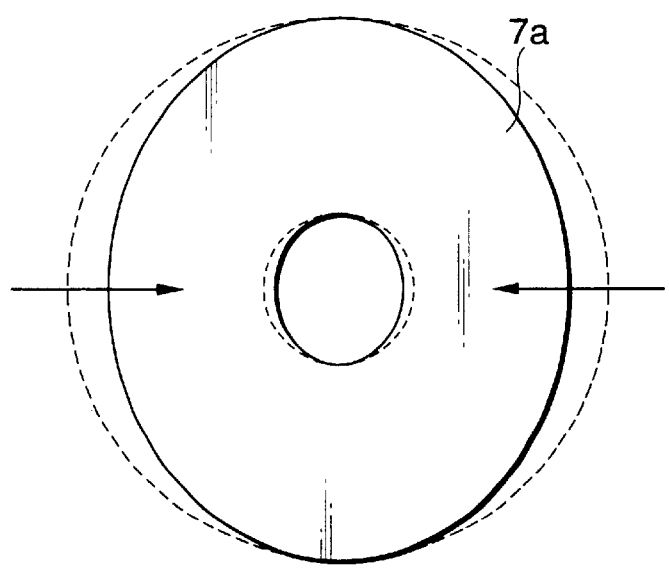
FIG. 9 is an explanatory view of the deformed state of an inner race in the conventional toroidal-type continuously variable transmission, when the inner race is pressed by a rolling element.
Figure 10A:
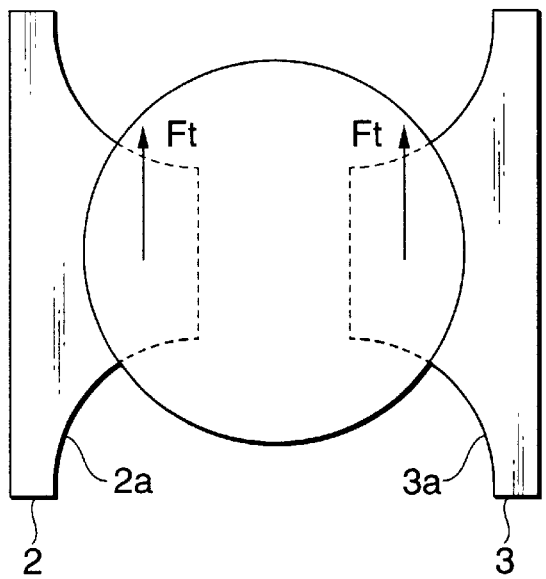
FIGS. 10A and 10B are explanatory views of forces in the tangential direction occurring in the traction contact portions in the conventional toroidal-type continuously variable transmission.
Figure 10B:
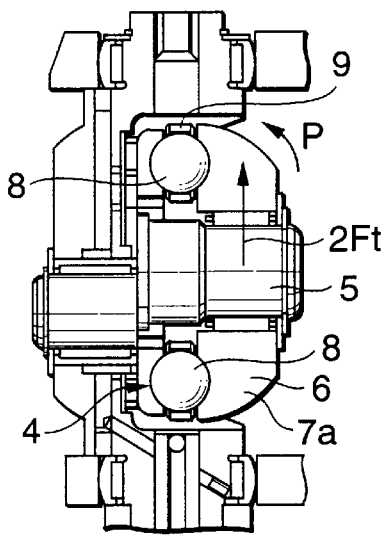
Figure 11:
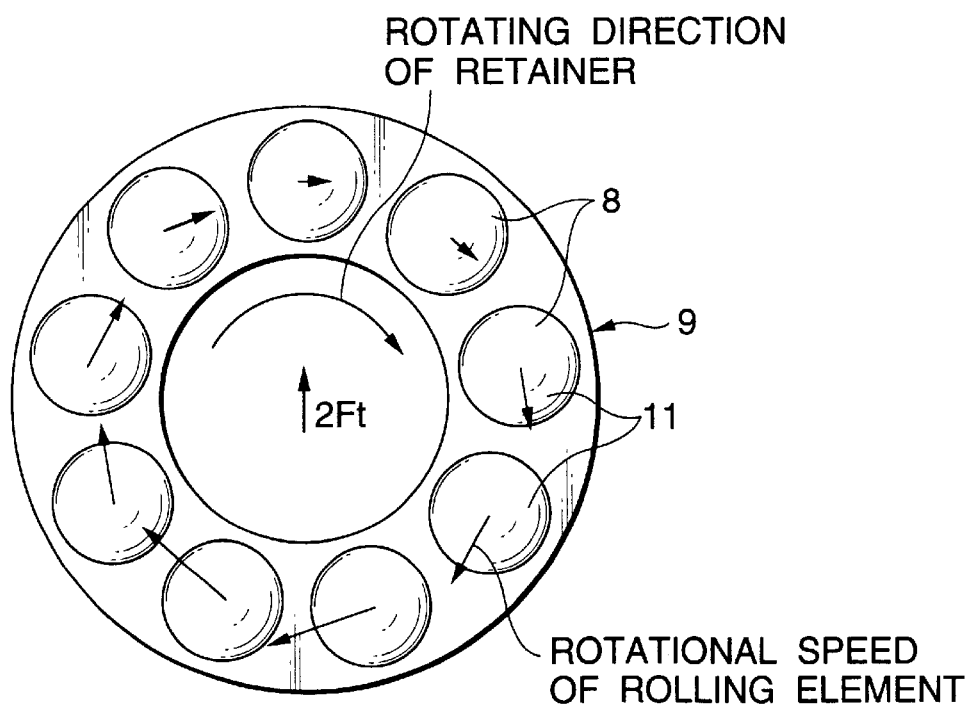
FIG. 11 is an explanatory view of the rotation speed of a rolling element around a retainer in the thrust rolling bearing in the conventional toroidal-type continuously variable transmission.
Figure 12:
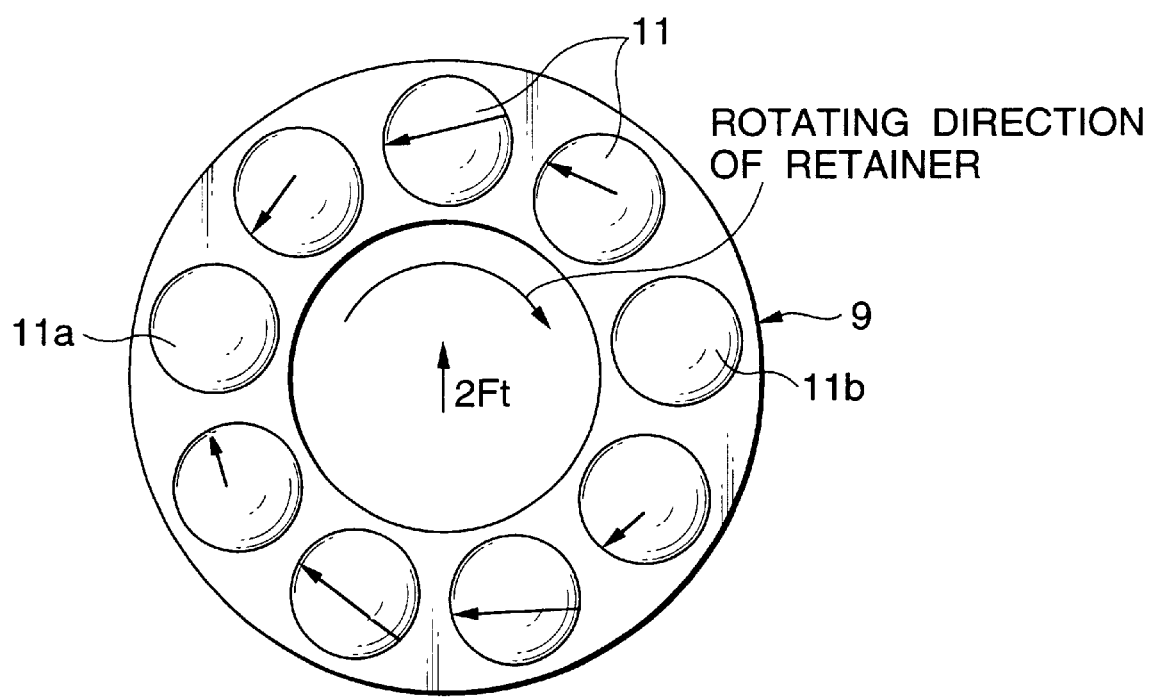
FIG. 12 is an explanatory view of contact loads between a rolling element and a retainer in the thrust rolling bearing in the conventional a toroidal-type continuously variable transmission.
Figure 14:
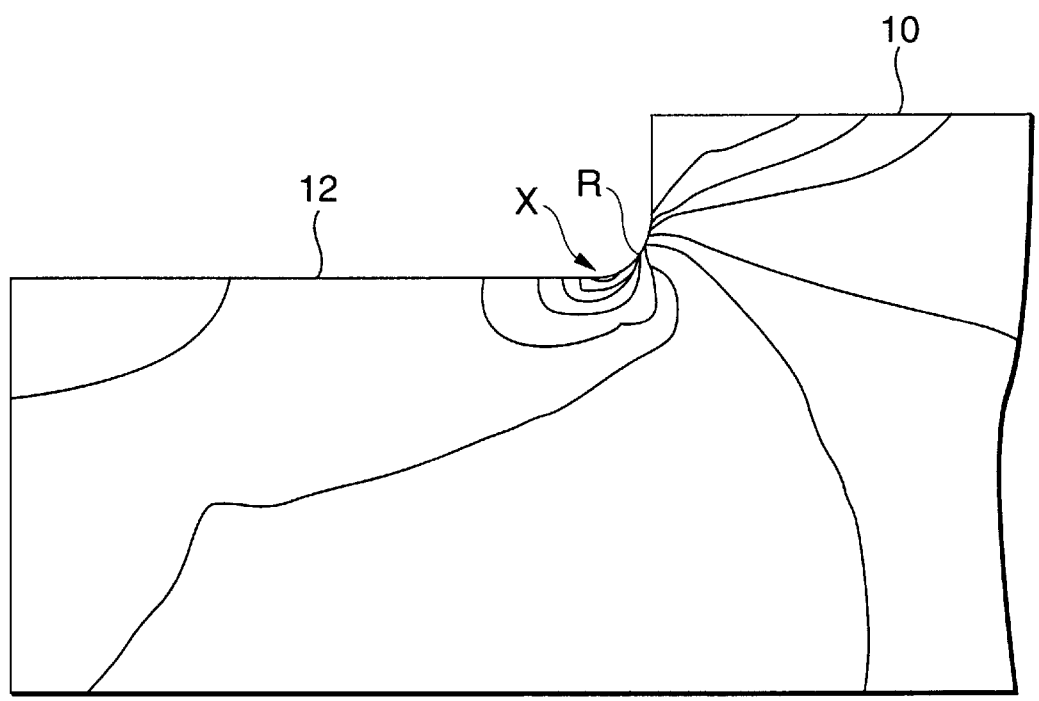

Now, FIGS. 5A to 6 show a third embodiment of a toroidal-type continuously variable transmission according to the invention. In the third embodiment, the same components thereof as those employed in the conventional toroidal-type continuously variable transmission are given the same reference characters and thus the description thereof is omitted here.

A retainer 21 shown in FIGS. 5A and 5B, as discussed before in connection with the description of the related art, is disposed in a thrust rolling bearing 7 which is interposed between a power roller 6 and a trunnion 4 in toroidal-type continuously variable transmission. The retainer 21 is constructed by a circular-ring-shaped main body 22, and a plurality of pockets 24 which are respectively disposed in the intermediate portion of the main body 22 in the diameter direction thereof and are used to rollably hold rolling elements 23. Further, there are formed a plurality of lubricating oil passages 25 between the inner and outer peripheral edges of the main body 22 in such a manner that the lubricating oil passages 25 respectively cross the pockets 24.

Each of the lubricating oil passages 25 respectively formed between the inner and outer peripheral edges of the main body 22 is formed in a single arc shape in section. That is, the main body 22 of the retainer 21 has the same thickness T as that of the conventional retainer and the distance t between the groove bottoms of the lubricating oil passages 25 is also the same as that of the conventional retainer.

However, in the present lubricating oil passages 25, the single arc R dimension of the section thereof is set in the range of 3 mm to 10 mm, and the distance t between the groove bottoms thereof is set at least 3 mm or more; and, preferably, the single arc R dimension may be set for 5 mm.

According to a test conducted by the present inventors, it has been found that, in case where the section of the lubricating oil passages 25 is formed so as to have a single arc R dimension of 5 mm, stresses occurring in-the lubricating oil passages 25 can be reduced down to about 60%. Also, the section area of the lubricating oil passage 25 can also be set equivalent to that of the conventional recessed groove and thus the flow amount of lubricating oil flowing in the lubricating oil passage 25 can be set the same as that of lubricating oil flowing in the conventional recessed groove.

Further, by changing the single arc R dimension of the lubricating oil passage 25, the distance t between the groove bottoms of the lubricating oil passages 25 can also be set equal to or larger than that in the conventional lubricating oil passage. Since the retainer 21 is installed in such a manner that it is held between the outer race and power roller 6, the retainer 21 must be formed within a limited dimension. However, as described above, it is preferable that the single arc R dimension of the section thereof is set in the range of 3 mm to 10 mm, and the distance t between the groove bottoms thereof is set at least 3 mm or more.

According to the present structure, in case where the lubricating oil passage 25 of the retainer 21 used under the same conditions as the conventional conditions is formed so as to have a single arc shape, there can be obtained the distribution of stresses occurring in the lubricating oil passage 25 as shown in FIG. 6, which can reduce the maximum stress X, can prevent the retainer 21 from being damaged in and from the lubricating oil passage 25, and thus can enhance the durability of the retainer 21.

While only certain embodiments of the invention have been specifically described herein, it will apparent that numerous modifications may be made thereto without departing from the spirit and scope of the invention.

As has been described heretofore, according to the invention, there is provided a retainer which is constructed by a circular-ring shaped main body and a plurality of pockets formed in the intermediate portion of the main body in the diameter direction thereof for holding therein rolling elements, and a clearance between the pocket and rolling element is set in the range of 0.6 to 6.0% of the ball diameter of the rolling element. Therefore, there can be obtained effects that a retainer according to the invention can have a strength necessary as a retainer for use in a car, can guide the rolling elements in the optimum manner, and thus can enhance the durability of itself.

Further, according to the invention, there is provided a retainer for use in a toroidal-type continuously variable transmission which is constructed by a circular-ring-shaped main body and a plurality of pockets formed in the intermediate portion of the main body in the diameter direction thereof for holding therein rolling elements, wherein, between the inner and outer peripheral edges of the main body, there are formed a plurality of lubricating oil passages each having a section of a single arc shape. Thus, the distribution of stresses applied to the lubricating oil passages of the retainer can be relieved to thereby be able to enhance the durability and reliability of the retainer.

What is claimed is:

1. A toroidal-type continuously variable transmission, comprising:
    a rotary shaft;
    first and second disks rotatably supported on the periphery of said rotary shaft respectively, each of the inner surfaces of said first and second disks defining a concave surface having an arc-shape in section, said inner surfaces of said first and second disks being disposed opposed to each other;
    a trunnion swinging about a pivot shaft situated at a torsional position with respect to the center axes of said first and second disks;
    a displacement shaft provided in said trunnion;
    a power roller held between said first and second disks in such a manner as to be rotatably supported on the periphery of said displacement shaft, said power roller including a peripheral surface formed in a spherical convex surface; and
    a thrust rolling bearing interposed between said power roller and said trunnion for supporting a thrust-direction load applied to said power roller,
        wherein said thrust rolling bearing comprises a plurality of rolling elements and a retainer rollably holding said plurality of rolling elements,
        said retainer defines a circular-ring-shaped main body and a plurality of pockets respectively formed in said main body for rollably holding said plurality of rolling elements, and,
        a clearance between said pocket and said rolling element is set in the range of 0.6 to 6.0% of the ball diameter of said rolling element.

2. A toroidal-type continuously variable transmission as set forth in claim 1, wherein a hole shape of said pocket penetrates in a thickness direction of said retainer, and is a combination of a cylindrical portion opened at one end side of said retainer and a spherical portion opened at the other side thereof.

3. A toroidal-type continuously variable transmission as set forth in claim 2, wherein said spherical portion is formed by caulking.

4. A toroidal-type continuously variable transmission as set forth in claim 1, wherein said pocket is an elongated hole.

5. A toroidal-type continuously variable transmission, comprising:
    a rotary shaft;
    first and second disks rotatably supported on the periphery of said rotary shaft respectively, each of the inner surfaces of said first and second disks defining a concave surface having an arc-shape in section, said inner surfaces of said first and second disks being disposed opposed to each other;
    a trunnion swinging about a pivot shaft situated at a torsional position with respect to the center axes of said first and second disks;
    a displacement shaft provided in said trunnion;
    a power roller held between said first and second disks in such a manner as to be rotatably supported on the periphery of said displacement shaft, said power roller including a peripheral surface formed in a spherical convex surface; and
    a thrust rolling bearing interposed between said power roller and said trunnion for supporting a thrust-direction load applied to said power roller, wherein said thrust rolling bearing comprises a plurality of rolling elements and a retainer rollably holding said plurality of rolling elements, said retainer defines a circular-ring-shaped main body, a plurality of pockets respectively formed in said main body for rollably holding said plurality of rolling elements, and a plurality of lubricating oil passages respectively formed between the inner and outer peripheral edges of said main body in such a manner as to cross said pockets respectively, each of said lubricating oil passages having a section formed in a single arc shape.

* * * * *